C. A. HORNBURG.
RETAINING RING.
APPLICATION FILED APR. 7, 1916.

1,218,865.

Patented Mar. 13, 1917.

Witnesses

C. A. Hornburg,
Inventor by
Attorneys

UNITED STATES PATENT OFFICE.

CHARLES A. HORNBURG, OF DEVINE, TEXAS.

RETAINING-RING.

1,218,865.     Specification of Letters Patent.     Patented Mar. 13, 1917.

Application filed April 7, 1916. Serial No. 89,627.

*To all whom it may concern:*

Be it known that I, CHARLES A. HORNBURG, a citizen of the United States, residing at Devine, in the county of Medina and State of Texas, have invented a new and useful Retaining-Ring, of which the following is a specification.

By way of explanation it may be stated that automobile operators ordinarily have at their command, one or more tire casings which are not in use. These casings may be new or they may be casings which, having been used to a considerable extent and being more or less unfit for use alone, still are strong enough to be used as a protection for another casing.

In view of the foregoing, this invention aims to provide means whereby a tire casing, either new or used, may be assembled with another tire casing, preferably but not necessarily of identical form, to serve as a protection for the last named casing.

With the above and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:—

Figure 1:
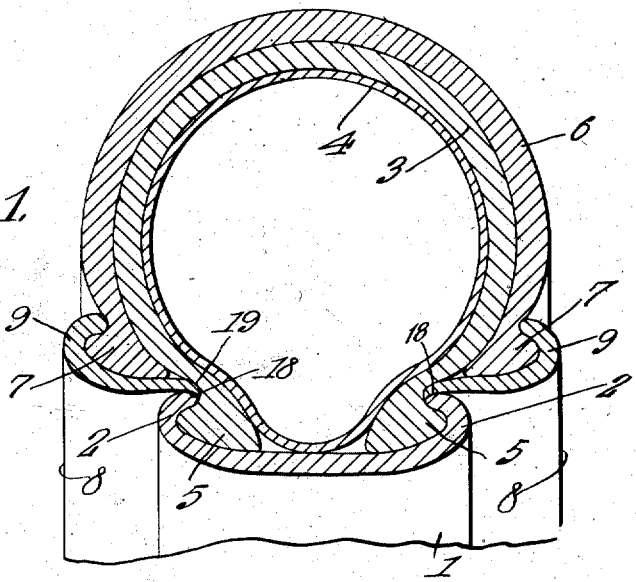
Figure 1 shows in transverse section, a device constructed in accordance with the present invention, and of the form delineated in Fig. 2.
Figure 2:
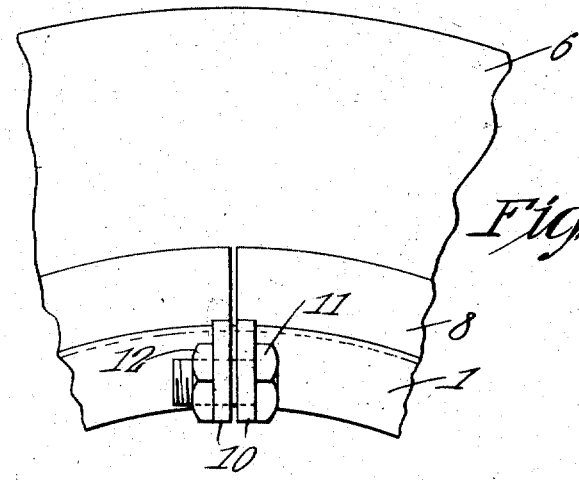
Fig. 2 is a fragmental side elevation showing a portion of the structure depicted in Fig. 1.

In the accompanying drawings, the numeral 1 indicates a rim provided with flanges 2. At 3 there is shown a main tire casing having beads 5 interengaged with the flanges 2.

Disposed within the main casing 3 is an inner tube 4. The foregoing details are common, and no novelty is claimed for them, saving in so far as they may enter into combination with the other elements to be described hereinafter.

Surrounding the main casing 3 is an outer auxiliary casing 6, which, ordinarily is constructed exactly like the main casing 3, although a similarity between the two casings is not insisted upon. The auxiliary casing 6 is provided with beads 7.

The invention comprises a pair of side rings 8 including clencher flanges 9 receiving the beads 7 of the auxiliary casing 6. The rings 8 project inwardly beyond the inner edges of the beads 7 and rest on the flanges 2 of the main rim 1.

The inner edges of the flanges 9 are concaved slightly as shown at 18 and coöperate with the flanges 2 to prevent the side rings 8 from moving outwardly, the flanges 9 being rounded as shown at 19, to coöperate with the main casing 3. The rings 8 are supplied at their ends with integral lugs 10 connected by a bolt 11 and a nut 12, or in any other suitable manner.

Figure 3:
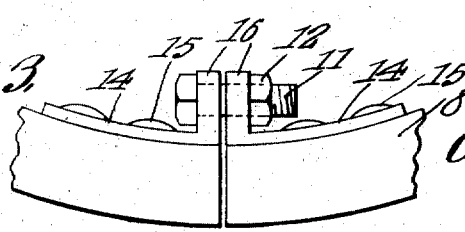
Fig. 3 is a fragmental elevation showing a modified form of the invention.

As shown in Fig. 3 of the drawings, the rings carry plates 14 held to the ends of the rings by securing elements 15. The plates 14 carry lugs 16 having the same functions as the lugs 10, the lugs 16 being connected by a bolt 11 and a nut 12, or in any other suitable manner as hereinbefore described.

From the foregoing, it will be observed that this invention provides a novel means whereby one casing may be assembled with another, as a protection therefor.

Having thus described the invention, what is claimed is:—

In a device of the class described, a rim including flanges; a main casing having edges coacting directly with the flanges; an auxiliary casing disposed outside of the main casing and provided with clencher beads; and rings having clencher flanges receiving the beads of the auxiliary casing, the rings resting on the outer edges of the flanges of the main rim and terminating at said outer edges, thereby to permit the edges of the main casing to coact directly with the flanges of the main rim.

In testimony that I claim the foregoing as my own, I have hereto affixed my signature in the presence of two witnesses.

CHARLES A. HORNBURG.

Witnesses:
  M. A. KELLER,
  O. L. BILES.